(12) United States Patent
Betts et al.

(10) Patent No.: US 7,155,016 B1
(45) Date of Patent: Dec. 26, 2006

(54) COMMUNICATION DEVICE AND METHOD FOR USING NON-SELF-SYNCHRONIZING SCRAMBLING IN A COMMUNICATION SYSTEM

(75) Inventors: William L. Betts, St. Petersburg, FL (US); Gordon Bremer, Clearwater, FL (US); Kurt Holmquist, Largo, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/427,600

(22) Filed: Oct. 27, 1999

Related U.S. Application Data

(60) Provisional application No. 60/150,093, filed on Aug. 20, 1999.

(51) Int. Cl.
*H04B 14/00* (2006.01)

(52) U.S. Cl. .............. 380/268; 380/221; 380/255; 380/274; 713/152

(58) Field of Classification Search .......... 713/152; 380/210, 221, 244, 255, 268, 274
See application file for complete search history.

(56) References Cited

U.S. PATENT DOCUMENTS

| | | | | |
|---|---|---|---|---|
| 4,594,609 A | * | 6/1986 | Romao et al. | 358/119 |
| 4,603,413 A | | 7/1986 | Sinjou et al. | 369/59 |
| 4,924,516 A | | 5/1990 | Bremer et al. | 380/46 |
| 5,235,645 A | * | 8/1993 | Stocker | 380/48 |
| 5,375,171 A | | 12/1994 | Dewolf et al. | 380/49 |
| 5,488,663 A | * | 1/1996 | Dewolf et al. | 380/49 |
| 5,530,959 A | | 6/1996 | Amrany | 380/48 |
| 5,646,996 A | * | 7/1997 | Latka | 380/21 |
| 5,917,852 A | * | 6/1999 | Butterfield et al. | 375/200 |
| 6,229,897 B1 | * | 5/2001 | Holthaus et al. | 380/270 |
| 6,349,138 B1 | * | 2/2002 | Doshi et al. | 380/200 |

* cited by examiner

*Primary Examiner*—Albert Decady
*Assistant Examiner*—Nadia Khoshnoodi
(74) *Attorney, Agent, or Firm*—Thomas, Kayden, Horstemeyer & Risley LLP

(57) ABSTRACT

A communication device for use in a non-self synchronizing scrambling (NS3) communication system and a method for using NS3 in a communication system are disclosed. A digital data stream is scrambled by modifying the digital data stream based on a pseudo-noise sequence (PNS) to produce a scrambled digital data stream. The PNS has a timing reference that is distinct from the digital data stream. The scrambled digital data stream is capable of being descrambled by performing an inverse modification, based on the same PNS and the same timing reference. The scrambled digital data stream may be transmitted over a communication medium and descrambled at the opposing end of the communication medium. Synchronization between the scrambler and the descrambler is maintained by providing a common timing reference to the scrambler and the descrambler. The common timing reference is distinct from the data stream. The invention can be used on any communication system in which all the communication devices have a common timing reference.

27 Claims, 9 Drawing Sheets

COMMUNICATION DEVICE AND METHOD FOR USING NON-SELF-SYNCHRONIZING SCRAMBLING IN A COMMUNICATION SYSTEM

CROSS REFERENCE TO RELATED APPLICATIONS

This application claims priority to and the benefit of the filing date of co-pending and commonly assigned provisional application entitled A TECHNIQUE FOR USE OF NON-SELF-SYNCHRONIZING SCRAMBLING IN A COMMUNICATIONS SYSTEM, assigned Ser. No. 60/150,093, filed Aug. 20, 1999, and hereby incorporated by reference.

TECHNICAL FIELD

The present invention is generally related to communication systems, and more particularly, to a communication device and method for using non-self-synchronizing scrambling to reduce communication errors in a communication system.

BACKGROUND OF THE INVENTION

Modems are used in the field of data communications to convey information from one location to another. Most higher-speed modems include a scrambler. A scrambler is a device that pseudo-randomly modifies bits in the serial bit stream before modulation, typically by using a generating polynomial. The rationale for scrambling is to optimize transmission performance by insuring use of the entire signal space independently of any transmitted patterns that may occur in the source data stream. After being scrambled, the bit stream is transmitted over a communication medium. The bit stream is recovered at an opposing end of the communication medium by a descrambler using the same generating polynomial. The descrambler modifies the bits back to their original values. In order for the scrambling/descrambling process to proceed properly, the scrambler and the descrambler must be synchronized with each other.

Modems used on the public switched telephone network (PSTN) and on digital subscriber line (DSL) systems typically use a scrambling process known as self-synchronizing scrambling (S3). The key benefit of S3 is that it automatically resynchronizes the descrambling process with the scrambling process after any type of line disruption or corruption of data without the need to communicate to the opposing end scrambler. Unfortunately, S3 also suffers from the disadvantage of multiplying the number of errors and extending the duration of errors.

FIG. 1 illustrates the prior art problem of error multiplication in systems using S3. Illustrative prior art S3 system 100 includes transmitter 110, which includes scrambler 150, and receiver 120, which includes descrambler 160. Transmitter 110 transmits data to receiver 120 over communication medium 130. Within scrambler 150, shift register 101 stores information and exclusive-OR gate 102 performs modulo-2 addition on the contents of two predetermined shift register locations to form the scrambling signal. For purposes of illustration, it is assumed that two shift register locations, designated J and K in FIG. 1, are used. Of course, as is well known in the art, more than two locations may be used. The data is scrambled by adding the scrambling signal to the data stream in exclusive-OR gate 103 using modulo-2 addition. The scrambled data is typically coupled to a modulator (not shown) and to shift register 101. After being modulated, the scrambled data is transmitted over communication medium 130 to receiver 120. Line errors may occur during transmission.

Within the receiver 120, the scrambled data is typically provided by the output of a demodulator (not shown). After demodulation, the scrambled data is coupled to shift register 104 and exclusive-OR gate 105. The output of exclusive-OR gate 105 is the received data stream. Descrambling is provided by adding the scrambled data with the descrambling signal formed by exclusive-OR gate 106 using modulo-2 addition. Gate 106 forms this descrambling signal, which is identical to the scrambling signal used in the scrambler, by adding the contents of shift register locations J and K using modulo-2 addition The problem of error multiplication arises because a single error in the state of the descrambler input signal, relative to its transmitted counterpart, is coupled to shift register 104 in the descrambler, where it will subsequently appear at least two additional times during the formation of the descrambling signal, effectively tripling the bit error rate. The spacing between the initial bit error and the last additional error generated by the descrambling process is determined by the position of the last shift register location K relative to the shift register input, a typical value commonly used being 23 bits.

It is standard practice to transmit data in formatted blocks referred to as "frames" or more-correctly as "Protocol Data Units" or PDUs. Normally a PDU contains additional data used to detect the presence of transmission errors in the received data. If errors are detected, the entire PDU is normally discarded and retransmitted. In such an arrangement, the disadvantage associated with S3 is particularly pronounced in that, because of the error multiplication properties, a single bit error occurring near the end of one PDU may be extended by the descrambling process into the next PDU requiring retransmission of two completed PDUs. Likewise, when asynchronous transfer mode (ATM) cells are transmitted in a system using S3, there is an increased likelihood that an error near the end of one ATM cell may be extended into the next ATM cell. Such cells are typically created by segmenting larger PDUs and it is common for cells from multiple PDUs to be interleaved. Since a cell is smaller than a typical PDU it is more likely that a three-error burst resulting from a single transmission bit error will span the boundary between two consecutively transmitted cells requiring retransmission of all of the cells produced from two entire PDUs.

Therefore, the error propagation inherent in S3 not only increases bit errors, it may also have a noticeable impact on packet or cell errors and, as a result, on the overall performance of the communication system.

An alternative to S3 is non-self-synchronizing scrambling (NS3). NS3 eliminates the error multiplication and error burst extension shortcomings of S3. However, the use of NS3 has typically been avoided because of the difficulties in maintaining synchronization and recognizing loss of synchronization. NS3 uses a "pseudo-noise sequence" (PNS) generator to provide a signal that both scrambles data for transmission and descrambles the data at the receiver via bit-wise modulo-2 addition. A PNS is a data sequence that includes the randomness properties of true noise, but is nonetheless completely deterministic in that it can be exactly generated by any suitably designed logic that has been set to the correct initial state. The original data is recovered so long as the states of the scrambler and descrambler remain the same relative to the data stream. NS3 does not multiply errors or extend error bursts.

FIG. 2 illustrates a prior art system using NS3. Illustrative prior art NS3 system 200 includes transmitter 210, which includes scrambler 250, and receiver 220, which includes descrambler 260. Within scrambler 250, the scrambling signal is generated by transmitter PNS generator 201. Transmitter 210 and receiver 220 transmit and receive data over communication medium 230, during which line errors may occur.

In contrast to systems using S3, an important aspect of the PNS generator in an NS3 system is that the next state of the PNS generator (and hence its output, which is used to scramble or descramble data) is derived entirely from the previous state and is not dependent on any outside inputs, such as the data stream.

FIG. 3 illustrates a representative prior art PNS generator 201. To form the scrambling signal, exclusive-OR gate 212 modulo-2 adds the contents of two predetermined locations of shift register 211 to form one of the inputs to exclusive-OR gate 213. For purposes of illustration, it is assumed that two shift register locations, designated J and K in FIG. 3, are used. Of course, as is well known in the art, more than two locations may be used. The final step in forming the scrambling signal occurs when a logic high (i.e., a "1") is applied to the other input of exclusive-OR gate 213. The output of exclusive-OR gate 213 is the scrambling signal, which is modulo-2 added to the transmit data stream in exclusive-OR gate 203 (of FIG. 2) to scramble the data. The output of exclusive-OR gate 213 is also coupled to shift register 211. The initial state of this PNS generator is the contents of the shift register at the time the first bit of output is created. This can be any value that can be represented in K bits except all ones, since all ones produces only the trivial output sequence also composed of all ones. After being scrambled in exclusive-OR gate 203, the scrambled data is typically coupled to a modulator (not shown), where it is modulated and then transmitted over communication medium 230.

In contrast to the S3 case illustrated in FIG. 1, in the NS3 case illustrated in FIGS. 2 and 3, the scrambled signal is not coupled to shift register 211. Instead, the output of exclusive-OR gate 213 is coupled to shift register 211. Thus, the error multiplication problems inherent in S3 are avoided in the NS3 system of FIGS. 2 and 3 by isolating shift register 211 from the data stream.

Returning to FIG. 2, the scrambled data is transmitted to the receiver 220 over communication medium 230. Within the receiver 220, the scrambled data is typically provided by the output of a demodulator (not shown). The output of the demodulator is coupled to exclusive-OR gate 205. Descrambling is provided in exclusive-OR gate 205 by modulo-2 adding the scrambled data with the descrambling signal formed by receive PNS generator 204, which is configured identically to the PNS generator 201 in the transmitter. The output of exclusive-OR gate 205 is the received data stream. It is important to note that in this conventional NS3 arrangement the state of the PNS generators is advanced with each bit of transmitted or received data. So long as synchronization is established and maintained between the scrambler 250 and the descrambler 260, the descrambling signal generated by receive PNS generator 204 is identical to the scrambling signal generated by transmit PNS generator 201. If synchronization is lost, however, the descrambling signal will differ from the scrambling signal, generally resulting in a completely erroneous output (half the bits will be in error). Because the state of the PNS generators is advanced with each bit, maintaining synchronization requires that the demodulator at the receiver always produce the exact same number of bits of output that have been used as input to the modulator at the transmitter.

Initial synchronization of the scrambler and descrambler in a communication system using NS3 can be done during training. However, it is difficult to maintain synchronization because even minor line errors may cause omissions or additions to the transmitted data stream, and even a one bit error can cause loss of synchronization. Moreover, the receiver typically is not able to recognize when loss of synchronization has occurred. Even if loss of synchronization is recognized, the descrambler typically cannot resynchronize itself with the scrambler because the state of the transmit PNS generator 201 is unknown to the receive PNS generator 204. Because of the difficulties in maintaining and restoring synchronization if NS3 is used, S3 has been the preferred synchronization technique, despite its disadvantages in error propagation.

Many commonly used modulation schemes are capable of providing a number of different data rates using the same frequency bandwidth over the transmission medium. This is done by changing the number of bits used to encode a single transmitted symbol. Obviously the more bits that are used the greater is the alphabet of symbols that must be discriminated by the receiver and the greater the likelihood that noise added in transmission may erroneously convert one symbol value to another. This variable data rate capability is frequently beneficially used to allow transmission to continue, although at a lower rate, when the conditions of the transmission medium are degraded to the extent that transmission at the intended rate with an acceptable number of errors is no longer possible. For example, some modulation technologies (collectively referred to as Digital Subscriber Line or DSL modulations) have been developed that allow high speed data transmission over an ordinary telephone line while allowing simultaneous usage of the line for basic "plain old telephone service" (POTS). In such a system, activity of POTS equipment connected to the line, such as transitions between on-hook and off-hook states, ringing signals or pulse dialing signals, may drastically affect the ability to transmit the high speed data at the intended rate. By quickly and temporarily reducing the number of bits per symbol, DSL equipment can maintain transmission of critical data in the presence of such routine disturbances.

Although use of NS3 in such a "rate agile" system as described above may be desirable to eliminate the error multiplication of S3, current NS3 implementations are not practical for such uses. Unless both the transmitter and receiver simultaneously adapt to the new bits-per-symbol data rate on exactly the same transmitted data bit every time the rate is changed, the number of bits received will not match the number of bits transmitted. This means that the PNS generators will not be synchronized and the received data cannot be properly descrambled.

In some communication systems in which multiple stations share a common medium it is beneficial to use a transmission technique generally referred to as Time Domain Duplex or TDD in which, at any point in time, only a single station is transmitting. This allows the transmitting station to use the full "information space" (frequency bandwidth and symbol alphabet space) of the transmission medium and is particularly well suited to transmission of very "bursty" traffic patterns such as commonly occur during access to the Internet and other computer-based information services. In such a system, transmissions are necessarily discontinuous meaning that the bit stream is "started" at the beginning of a transmission and "stopped" at the end.

Again, current NS3 implementations are not practical for such systems. Added noise or other degradations may prevent the receiver from recognizing the exact beginning or end of a transmission. When this occurs, the number of bits produced by the receiver differs from the number of bits between the starting and stopping points of the transmit data stream. This causes the same, possibly unrecognizable and unrecoverable, loss of synchronization between the transmitter and receiver PNS generators.

Therefore, there is a need in the industry for a communication device and method that overcome these deficiencies and that provide a practical way for achieving the benefits of NS3 in communication systems.

SUMMARY OF THE INVENTION

This invention provides a communication device and method for using non-self synchronizing scrambling (NS3) in a communication system. Briefly described, this may be accomplished as follows:

A pseudo-noise sequence (PNS) is used to scramble a digital data stream comprising a series of bits and having a bit transmission rate. The PNS has a timing reference that is distinct from the digital data stream. The digital data stream is modified based on the PNS to produce a scrambled digital data stream. The scrambled digital data stream is capable of being descrambled by performing an inverse modification, based on the same PNS.

The scrambled digital stream may be scrambled in a first communication device and transmitted over a communication medium. Descrambling may be accomplished in a second communication device, which is synchronized to the first communication device. Synchronization between the first communication device and the second communication device is initially established through conventional means, such as a training sequence. Synchronization is maintained by clocking both communication devices, and hence the scrambling and descrambling, with a common timing reference that is distinct from the digital data stream.

An advantage of the invention is that it enhances communication system performance by eliminating the disadvantage of error multiplication inherent in S3 systems.

Another advantage of the invention is that it provides a practical means for maintaining synchronization in an NS3 communication system and particularly in more sophisticated systems that incorporate agile rate capabilities and use TDD transmission.

Another advantage of the invention is that it provides a practical means for maintaining synchronization in an NS3 communication system in systems that incorporate a multi-point communication discipline in which only a single tributary device transmits to a central control device at a time.

Other features of the present invention will become apparent to one with skill in the art upon examination of the following drawings and detailed description. It is intended that all such additional features be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

Figure 1:
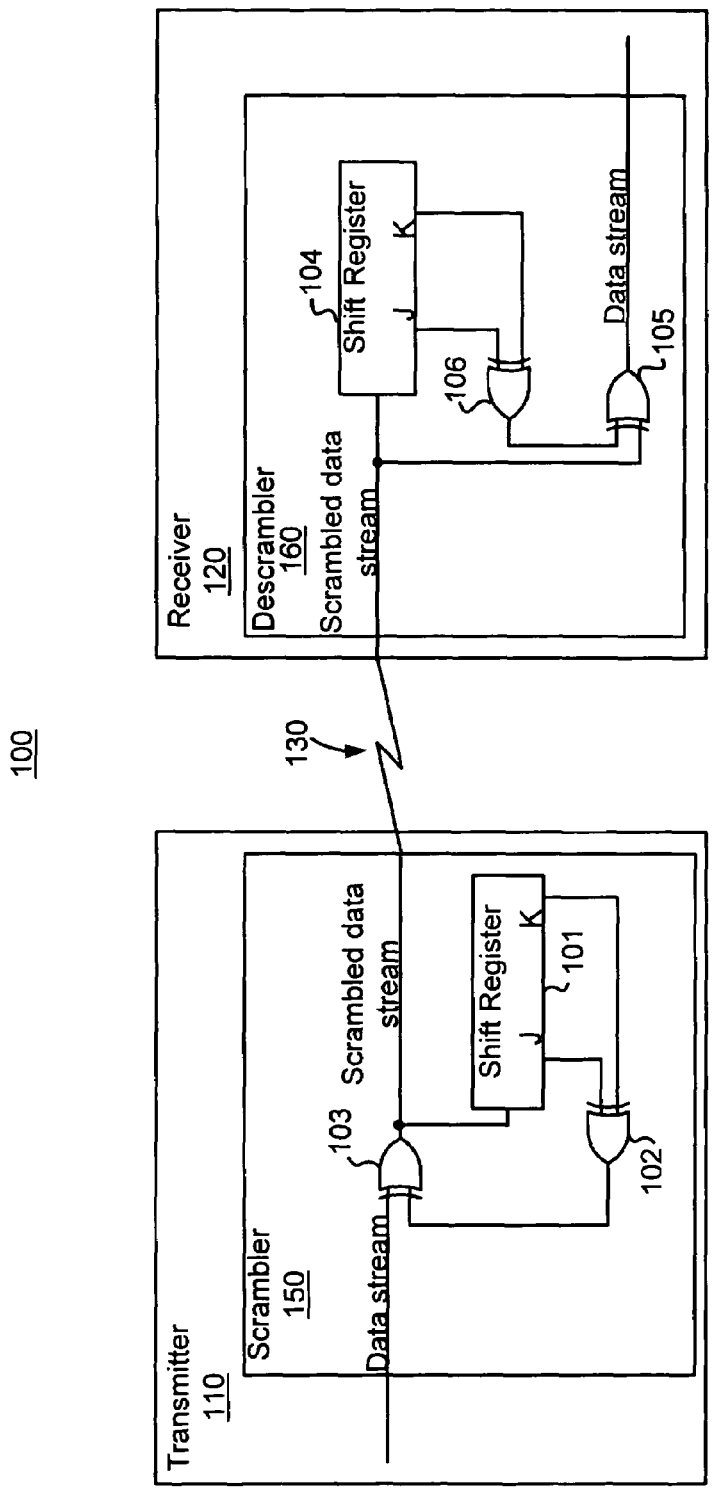
FIG. 1 is a simplified schematic diagram of an illustrative prior art S3 communication system.
Figure 2:
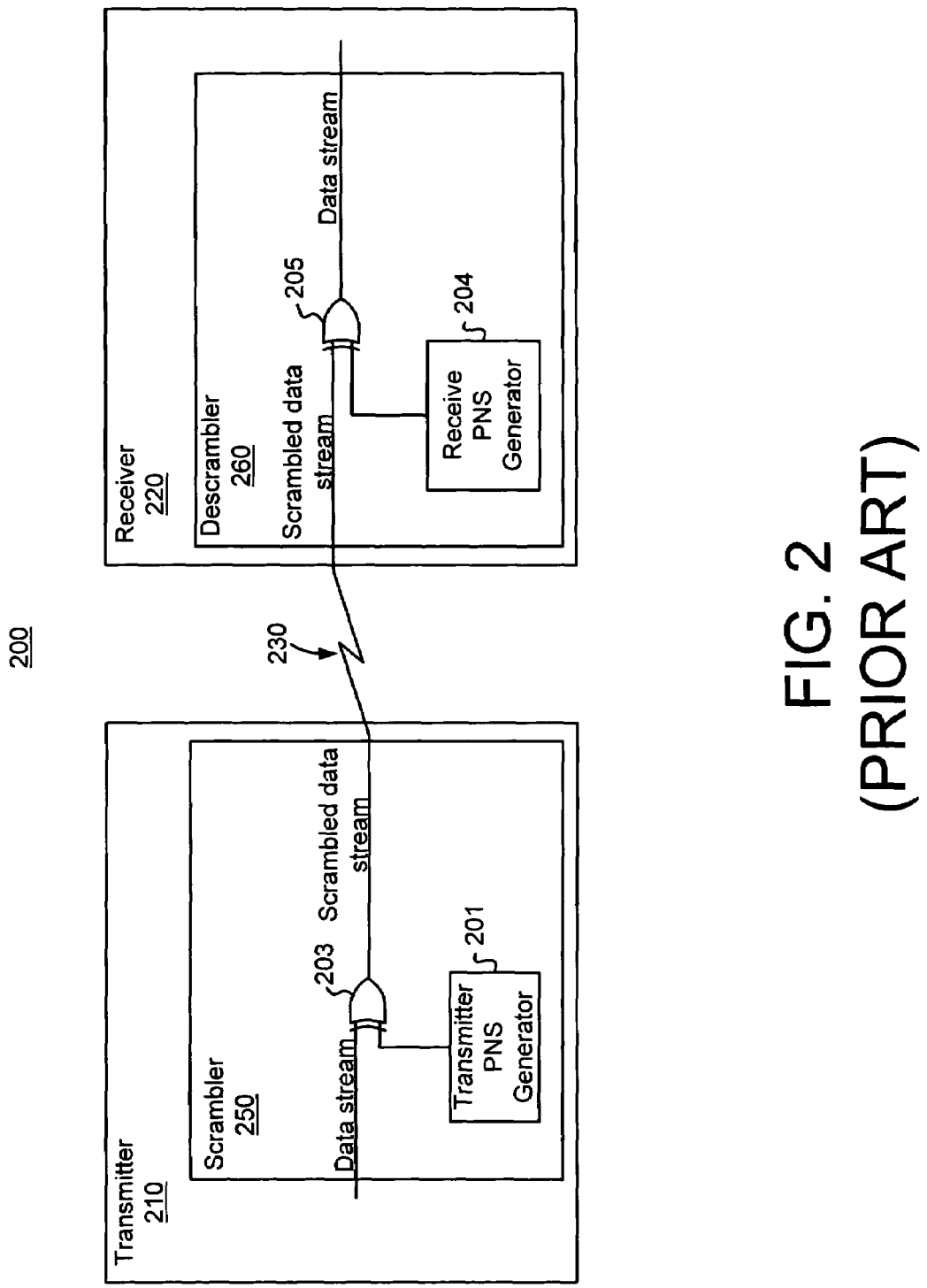
FIG. 2 is a simplified schematic diagram of an illustrative prior art NS3 communication system.
Figure 3:
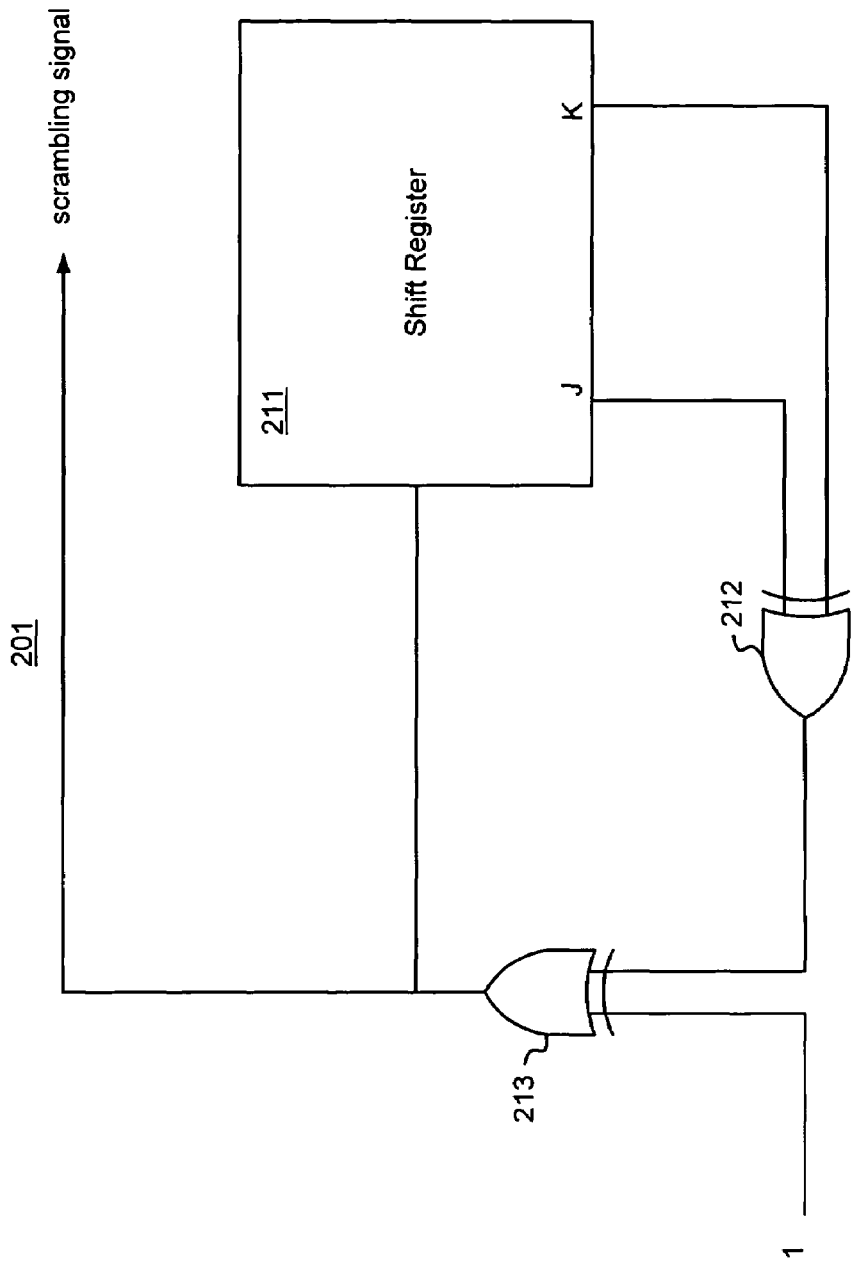
FIG. 3 is a simplified schematic diagram of an illustrative configuration of the pseudo-noise sequence ENS) generator of FIG. 2.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Figure 4:
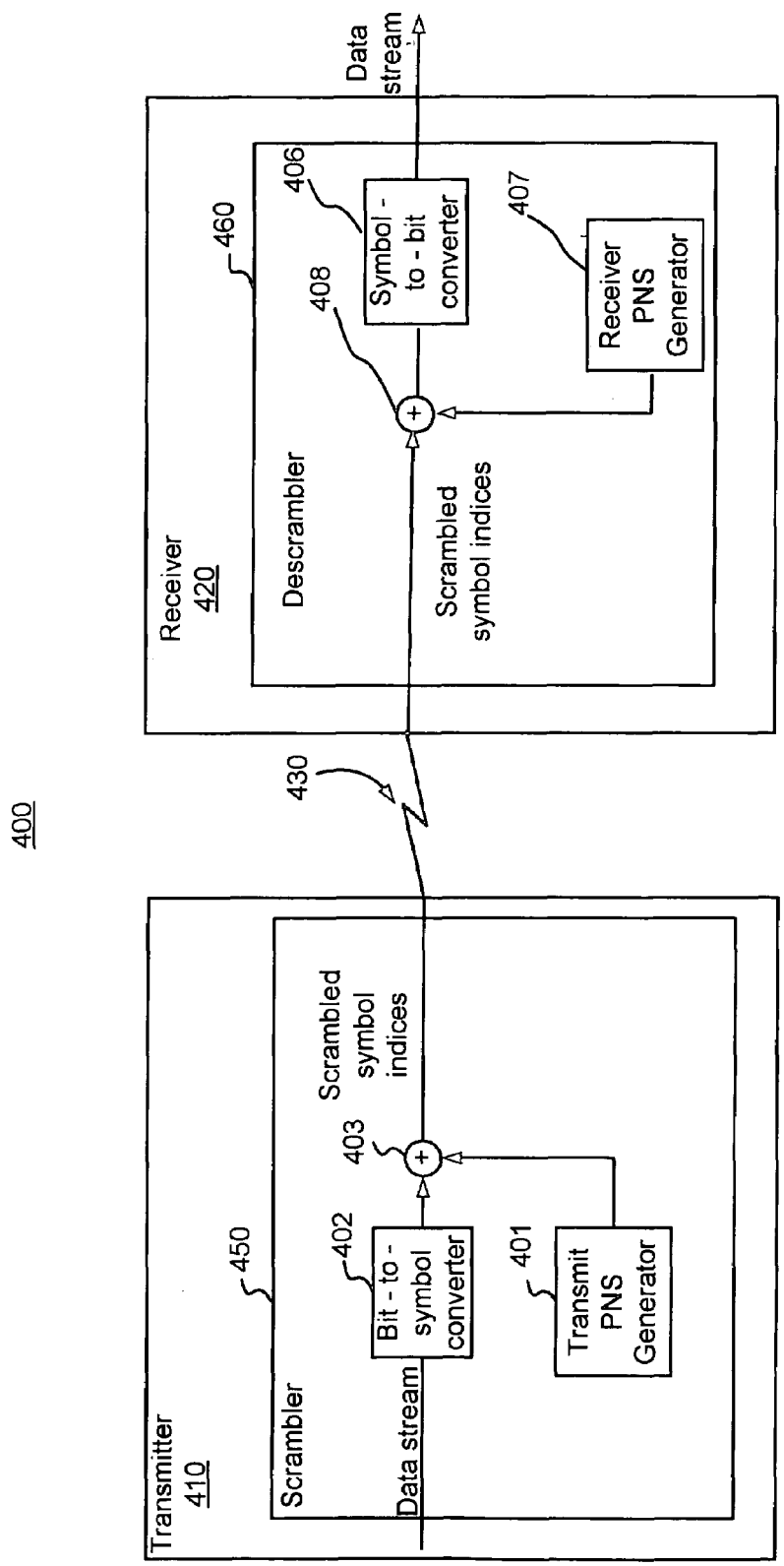
FIG. 4 is a simplified schematic diagram of an NS3 communication system in accordance with the present invention.

FIG. 4 is a simplified schematic diagram of an NS3 communication system in accordance with the present invention. System 400 includes transmitter 410, which includes scrambler 450, and receiver 420, which includes descrambler 460. Transmitter 410 transmits data to receiver 420 over communication medium 430.

In a conventional NS3 application, the output of the transmit PNS generator typically is modulo-2 added one bit at a time to the digital data stream being transmitted, which is typically a serial bit stream. However, in system 400 of FIG. 4, the digital data stream is first converted from bits to a set of symbol indices by bit-to-symbol converter 402 prior to being scrambled. Each symbol index is typically used to select an element from the symbol alphabet to be used for transmission. For example, in the commonly used quadrature amplitude modulation (QAM) technique, the index is used to select the amplitudes for the in-phase and quadrature pulses to provide the two inputs into a complex modulator. The terms "bit-to-symbol" or "symbol-to-bit" used henceforth are simplified terms that represent, respectively, processes used to convert a stream of bits into a stream of symbol indices and vice versa. These processes are commonly used in the art in a variety of modulation techniques. At the transmitter, bit-to-symbol conversion can be most easily accomplished through the use of a shift register whose input is the serial bit stream and whose output is taken as the contents of the shift register in parallel to provide the symbol index. At the receiver, this process is reversed such that the shift register is loaded in parallel with the symbol index followed by shifting out the contents of the shift register one bit at a time to produce the serial bit stream. Other processes can also be used, provided they achieve a reversable mapping of the data stream contents from bits to symbols and back again. The symbol indices produced at the output of bit-to-symbol converter 402 are therefore simply a set of numbers that correspond to the bits in the data stream. For an exemplary data rate of 8 bits per symbol, each number in the set is between 0 and 255, and corresponds to 8 bits in the data stream.

Illustrative transmit PNS generator 401 produces M bits of output at the symbol rate, where M is greater than or equal to the maximum possible number of bits per symbol for the system. M is determined relative to the maximum possible number of bits per symbol and is independent of the actual number of bits per symbol used in the data stream. Therefore, the state of the transmit PNS generator 401 after initialization depends only on the number of symbol intervals that have transpired since the generator was initialized, and is distinct from all data rates and the amount of data transmitted in the digital data stream. The PNS may be generated by an encryption algorithm having a suitably random output, such as an algorithm based on the Data Encryption Standard (DES). Use of such a PNS would have the added benefit of making the data difficult or impossible for unauthorized users to descramble, as discussed in U.S. Pat. No. 4,924,516.

Scrambling may be accomplished by any mathematical or logical modification of the symbol index that is both uniquely determined by the PNS output and has an inverse operation (for descrambling). Scrambling is accomplished illustratively in FIG. 4 by coupling the output of transmit PNS generator 401 and the output of bit-to-symbol converter 402 to adder 403, which in this embodiment is a modulo-2 adder. Alternatively, a conventional arithmetic adder may be substituted for adder 403 provided the result is reduced modulo-x, where x is the number of elements in the symbol alphabet currently being used (e.g. reduced modulo 256 if using 8 bits per symbol). Assuming a current data rate of N bits per symbol, at each symbol interval the N least significant (LS) bits of the total M bits produced by the transmit PNS generator 401 are added to the symbol index for that symbol interval in adder 403. The output of adder 403 is a symbol-wise scrambled data stream. The symbol-wise scrambled data stream is encoded and modulated by conventional means (not shown), and then transmitted over communication medium 430 to receiver 420.

In receiver 420, the symbol-wise scrambled data stream is demodulated and decoded by conventional means (not shown). The scrambled data stream is then coupled to adder 408. Adder 408 may be a modulo-2 adder or an arithmetic subtractor. The output of receive PNS generator 407 is also coupled to adder 408. Receive PNS generator 407 operates in a manner similar to transmit PNS generator 401. Assuming a current data rate of N bits per symbol, at each symbol interval the N least significant (LS) bits of the total M bits produced by the receiver PNS generator 407 are modulo-2 added to the symbol index for that symbol interval in adder 408. Alternatively, if scrambling is achieved by arithmetical adding, a conventional arithmetic subtractor is substituted for adder 408. The output of adder 408, which is a symbol-wise descrambled data stream is coupled to symbol-to-bit converter 406. The output of symbol-to-bit converter 406 is a conventional bit-wise descrambled data stream.

The transmit PNS generator 401 and the receive PNS generator 407 are initially synchronized during training. At some clearly defined symbol in the training sequence, such as the last symbol of a particular phase of training, both the transmitter 410 and the receiver 420 are directed to load their respective PNS generators to the same predetermined initial value. From this point forward, the generators are both advanced one state at the end of each interval in a common timing reference, which is a whole or fractional multiple of the interval between symbols. Due to transmission delays, the initialization of the receive PNS generator 407 occurs later in absolute time than the initialization of the transmit PNS generator 401. However, both PNS generators are initialized at the same point relative to the symbol stream transmitted by the transmitter 410 and received by the receiver 420. After initialization, the PNS generators remain synchronized because both PNS generators are advanced by a common timing reference, which illustratively is the symbol timing, to produce the next M bits of output for each symbol time.

The present invention is generally applicable to communication devices in any communication system. Its use is particularly advantageous in systems in which transmissions from any station are necessarily discontinuous including simple LANs, some DSL systems, and multi-point systems. Illustrative embodiments of the present invention in a rate-agile time domain duplex (TDD) communication environment are illustrated in FIGS. 5-9. In these illustrative embodiments, the communication devices are a DTU-C (Digital Subscriber Line Transceiver Unit-Central Office), and a plurality of DTU-Rs (Digital Subscriber Line Transceiver Units-Remote). However, the use of these particular communication devices is for purposes of illustration only, and is not intended to limit the applicability of the present invention.

Figure 5:
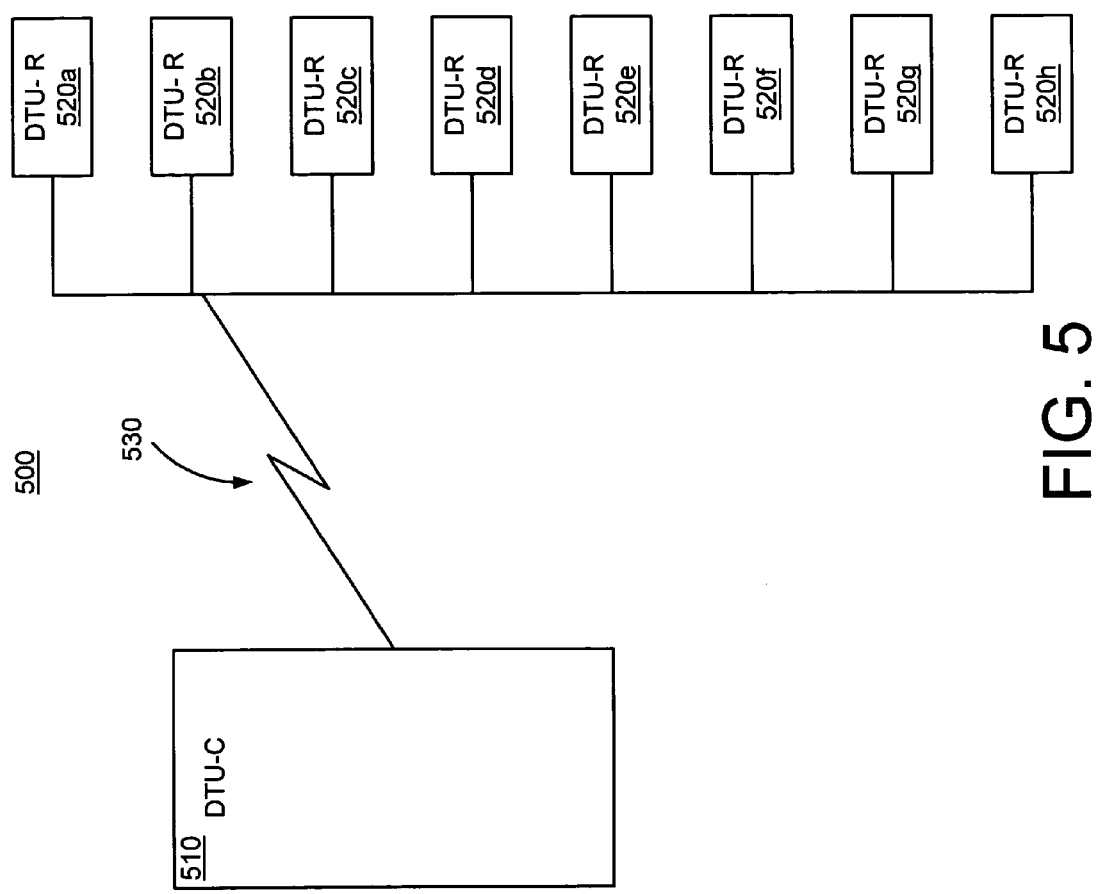
FIG. 5 is a simplified schematic diagram of an illustrative NS3 communication system having an DTU-C and a plurality of DTU-Rs.

FIG. 5 is a simplified schematic diagram of an illustrative communication environment 500 having one DTU-C 510 and eight DTU-Rs 520a-520h. The DTU-C 510 is at a central location, while each of the DTU-Rs 520a-520h is at a location remote from the DTU-C. The DTU-C 510 communicates with the DTU-Rs 520a-520h over communication medium 530. Each of the DTU-Rs can be in a different state of operation at any time, from fully powered off, to fully powered on and communicating. The communication scheme is half-duplex, whereby only one device can transmit at any one time. Transmission is coordinated by the DTU-C. The DTU-C and all of the DTU-Rs have a common timing reference (i.e., symbol or "baud" timing), for all data transfer. This common timing reference can be continuously maintained even with fairly frequent and severe disruptions to transmitted data. The present invention uses this common timing reference to clock the scrambling/descrambling process. Without the benefits of the current invention, using NS3 in such a multipoint system employing TDD and rate agility would be highly impractical due to the difficulty of maintaining PNS generator synchronization in each direction between the DTU-C and multiple DTU-Rs.

Synchronization is initially established during training. All of the DTU-Rs can be simultaneously trained on a single common training sequence sent from the DTU-C. Any specific symbol in the training sequence provides a global time reference for all stations on the line. Synchronization is established at this time by initializing all PNS generators with a predetermined value.

Synchronization is maintained by advancing the scrambler (of FIG. 4) by M bits every symbol time. The value of M is constant but is large enough to provide a new set of scrambling bits over all the bits in a symbol index during each symbol interval. In particular, in a rate-agile system in which the number of bits encoded into a symbol N can be varied to optimize the transmission rate for the current line conditions, M is constant and does not change as the data rate changes. In this case M is equal to or greater than the maximum number of bits that can be encoded into a symbol (i.e, the number of bits per symbol used at the maximum data rate.) This is practical, since, unlike the self-synchronizing scrambling process that requires transmit data as an input to generate the randomizing source, the randomizing source used by NS3 (e.g., the PNS generator) is self-contained and can generate any amount of randomizing data at any time. The number of bits of output provided by the PNS generator at each state M is sufficient to scramble all of the bits in a symbol index regardless of the number of bits per symbol N currently being used. If N is less than M, the M-N bits of PNS output are simply not used. As a result, if the number of bits per symbol is changed at any arbitrary time and the receiver succeeds in making the corresponding change on exactly the same symbol, the PNS generators will remain synchronized even though a limited burst of data errors may result.

When the scrambler is clocked with symbol timing, loss of scrambler synchronization typically indicates that symbol timing has been lost. Loss of symbol timing also prevents proper modulation/demodulation, which typically results in a retrain, wherein synchronization is reinitiated.

Figure 6:
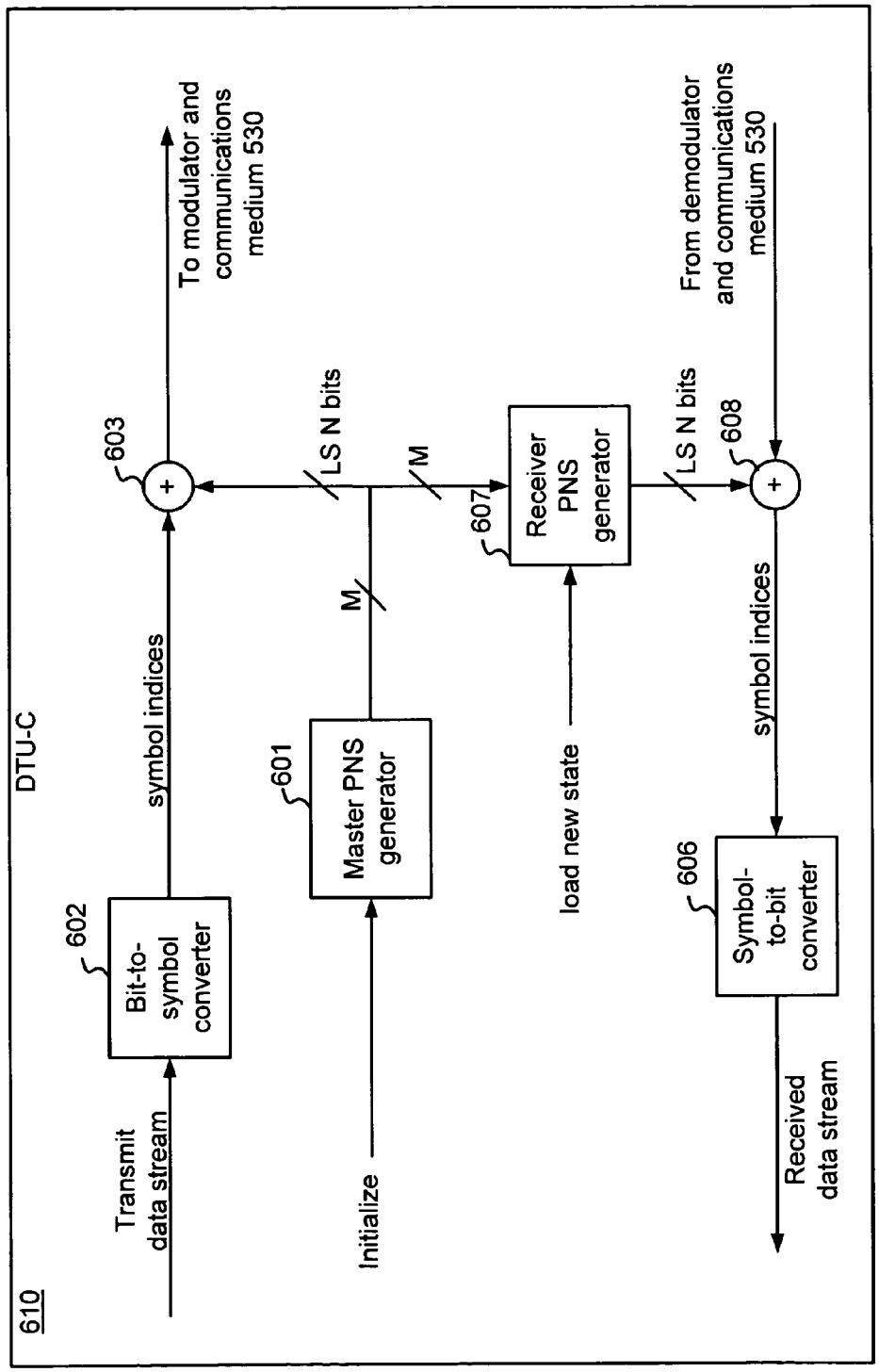
FIG. 6 is a simplified schematic diagram of a first embodiment of an DTU-C that is capable of transmitting and receiving data in the NS3 communication system of FIG. 5.
Figure 7:
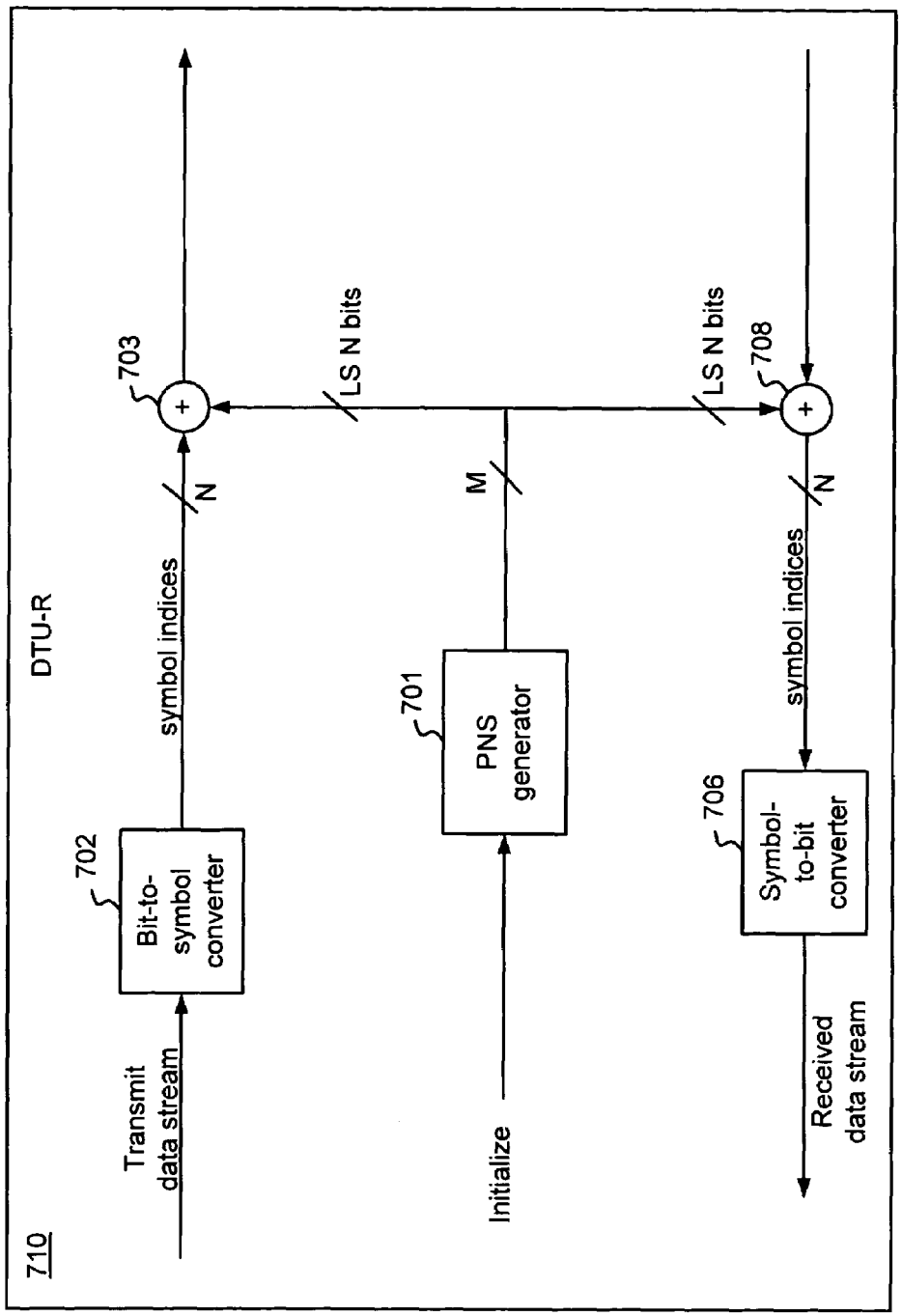
FIG. 7 is a simplified schematic diagram of a first embodiment of an DTU-R that is capable of transmitting and receiving data in the NS3 communication system of FIG. 5 in combination with the DTU-C of FIG. 6.

FIGS. 6 and 7 are simplified schematic diagrams, respectively, of a first embodiment of an DTU-C 610 and a first embodiment of an DTU-R 710 that are capable of transmitting and receiving data in the NS3 communication system of FIG. 5.

With reference to FIG. 6, for data scrambling and transmission, DTU-C 610 comprises master PNS generator 601, bit-to-symbol converter 602, and adder 603. Master PNS generator is advanced to the next state each symbol time. DTU-C 610 uses the output of master PNS generator 601 to scramble a data stream being transmitted in the manner discussed above with respect to FIG. 4.

With reference to FIG. 7, DTU-R 710 comprises a single PNS generator 701, the output of which is used in the manner discussed above with respect to FIG. 4 to either descramble a data stream being received or to scramble a data stream to be transmitted. DTU-R 710 further includes bit-to-symbol converter 702, adder 703, symbol-to-bit converter 706 and adder 708. PNS generator 701 is initialized at the same point in time relative to the data stream received from the DTU-C as PNS generator 601 in the DTU-C 610 of FIG. 6. Therefore, PNS generator 701 will have been advanced the same number of times when it receives any particular symbol as PNS generator 601 (of FIG. 6) had been advanced when it scrambled that symbol. PNS generator 701 is advanced every symbol time, regardless of whether DTU-R 710 is receiving a transmission.

DTU-R 710 only transmits when polled by DTU-C 610. Due to various system delays, such as hardware and software processing delays and queueing delays, and delays over the communication medium, there is some delay from the time DTU-C 610 finishes transmitting a poll until DTU-C 610 receives the start of the response from DTU-R 710. There may also be some variation in this delay from one poll to the next and from one DTU-R to the next. Unless the round trip delay that applies to the current response is known, the DTU-C will not have information regarding the state of the PNS generator in the DTU-R when the DTU-R started scrambling its response.

One potential solution to this problem is for each DTU-R to have two PNS generators, one for scrambling and one for descrambling and for the DTU-C to maintain a descrambling PNS generator for each DTU-R. The DTU-C's descrambling PNS generator for each DTU-R is initialized when that DTU-R transmits its training sequence.

A preferable solution takes advantage of the fact that the subsequent states of a PNS generator depend only on its previous state. As long as the DTU-C has information regarding the state of the PNS generator in the DTU-R when the DTU-R scrambles the first symbol of its response, the DTU-C can descramble this symbol and all following symbols. One convenient way to accomplish this is for the DTU-R to simply use the state of its PNS generator after descrambling the last symbol of the poll message. As shown in FIG. 7, an DTU-R 710 configured in this manner uses the same PNS generator 701 for both transmit scrambling and receive descrambling. In the transmit mode, the output of PNS generator 701 is modulo-2 added to the output of bit-to-symbol converter 702 to produce the scrambled DTU-R transmit data stream. As discussed above, scrambling also may be accomplished by arithmetically adding the output of PNS generator 701 to the output of bit-to-symbol converter 702 to produce the scrambled DTU-R transmit data stream.

Using this approach, as shown in FIG. 6, the DTU-C uses a separate receive PNS generator 607 to descramble the received data stream. Receive PNS generator 607 is loaded with the output of the master PNS generator 601 after the last symbol of the poll message has been scrambled (i.e., the output of master PNS generator 601 at the next state following the output used to scramble the last symbol). The DTU-C's receiver PNS generator 607 holds this initial state and is not advanced until reception of the DTU-R's response begins. The receive PNS generator 607 is then advanced once per received symbol. Since receive PNS generator 607 starts with the same state used by the DTU-R's PNS generator 701 to scramble the first symbol of the DTU-R's response, receive PNS generator 607 regenerates the same PN sequence as the DTU-R's PNS generator 701. It is important to note that this permits the DTU-C to use only a single receive PNS generator (and thus conserve hardware and processing resources) for descrambling the transmission from any number of DTU-Rs. Since the DTU-C always has information regarding the state of its transmit PNS generator at the end of any message it sends containing the poll signal that enables transmission by an DTU-R, the DTU-C correspondingly has information regarding the PNS generator state used by any responding DTU-R to scramble the first symbol of its transmission.

Figure 8:
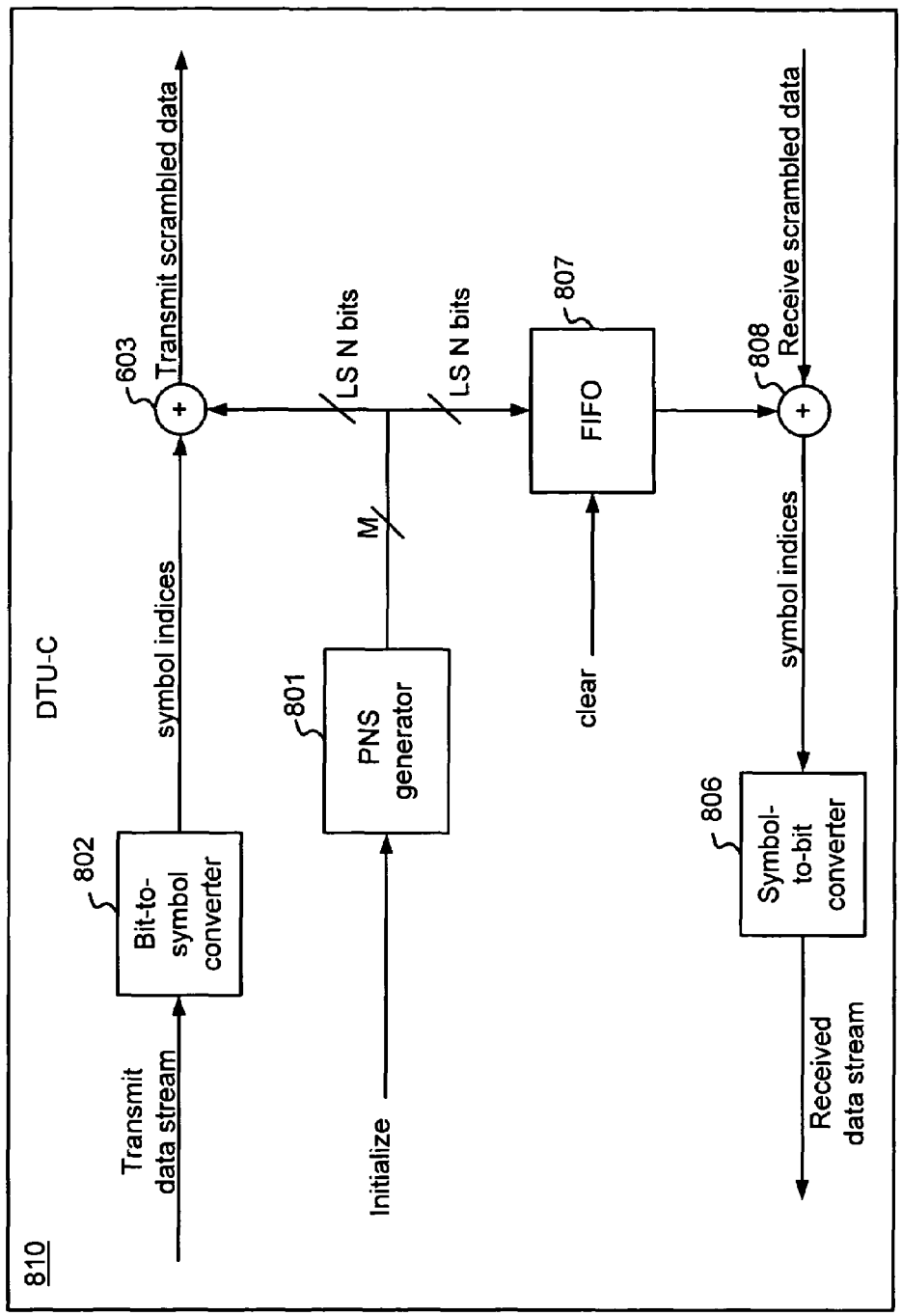
FIG. 8 is a simplified schematic diagram of a second embodiment of an DTU-C that is capable of transmitting and receiving data in the NS3 communication system of FIG. 5.

FIG. 8 is a simplified schematic diagram of a second embodiment of an DTU-C 810 that is capable of transmitting and receiving data in the NS3 communication system of FIG. 5. DTU-C 810 is similar to DTU-C 610 of FIG. 6, except that DTU-C 810 adds a FIFO register 807 and eliminates the receive PNS generator 607 included in DTU-C 610. The second embodiment of FIG. 8 may be used if the computational load for the separate receiver PNS generator is greater than that needed to access a FIFO register. Although the computational load of the representative shift-register based PNS generator may be modest, the use of other more elaborate PNS generators may be desirable. The FIFO register is used to store previous states of the transmit PNS generator that exist during the delay from the end of a message transmitted by the DTU-C until reception of the beginning of a message sent by the responding DTU-R. Saving these states avoids the need to regenerate them when the DTU-R message arrives as was the case in the previous embodiment (FIG. 6).

When the DTU-C 810 scrambles the last symbol of a poll message, it clears the FIFO register 807. The output of PNS generator 801 is written into the FIFO register on each symbol so, when the next state is available, the previous state is moved toward the head of the FIFO register. While the DTU-C is waiting for the DTU-R to respond, subsequent outputs of the PNS generator are loaded into the FIFO. When the response from the DTU-R arrives, the PNS generator states stored in the FIFO register are identical to those used to scramble the first part of the message. As these states are read out of the FIFO register to descramble the received message, the output of the PNS generator continues to be loaded into the FIFO register.

Since the DTU-C's FIFO register stores all outputs of the PNS generator from the next symbol following the last symbol of the transmitted message until the arrival of the DTU-R's response, its depth has to be at least as great as the maximum response delay time for all DTU-Rs, which is referred to herein as Dx. If this delay is relatively large, it may be undesireable to provide this much FIFO memory in the DTU-C.

Figure 9:
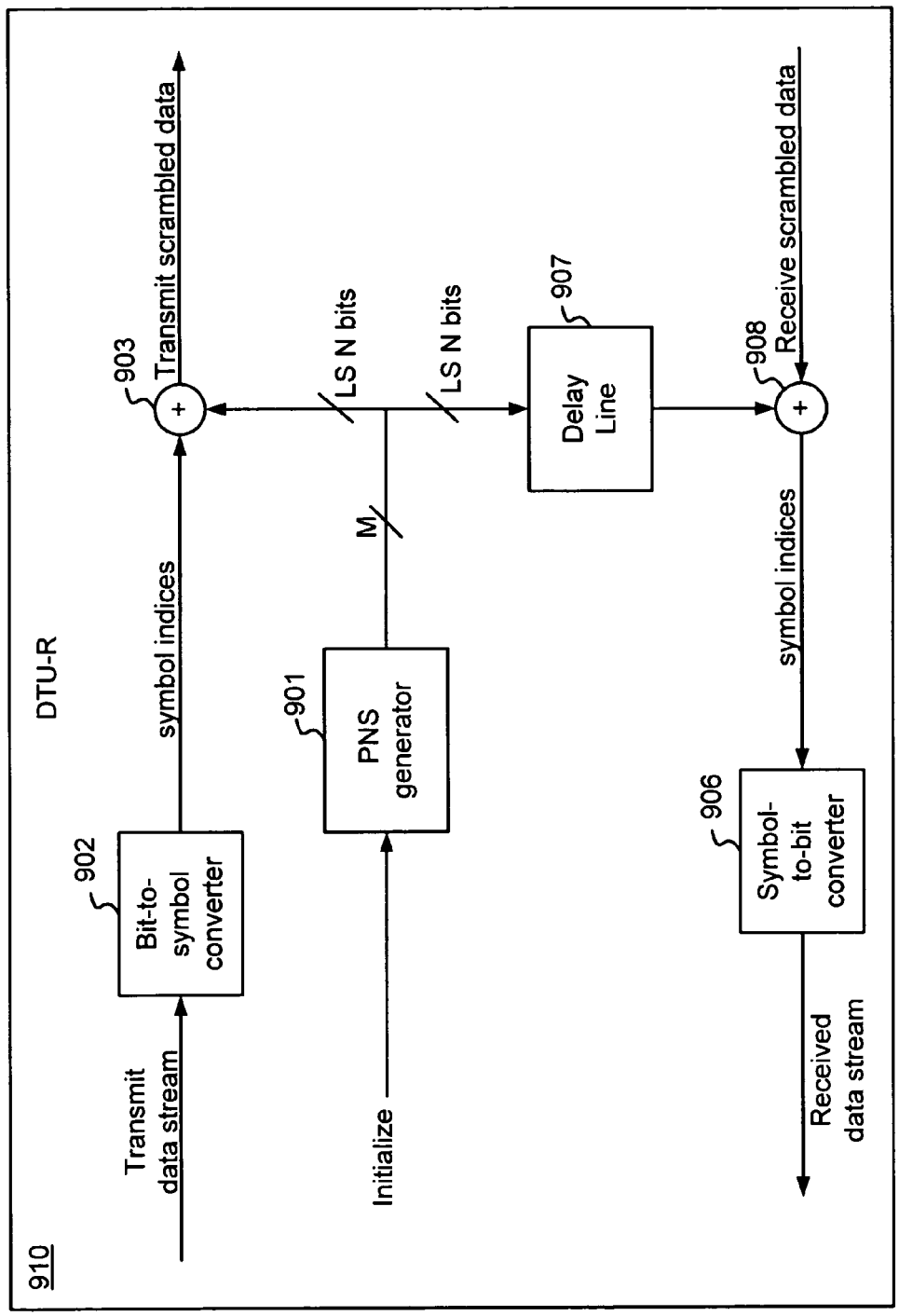
FIG. 9 is a simplified schematic diagram of a second embodiment of an DTU-R that is capable of transmitting and receiving data in the NS3 communication system of FIG. 5 in combination with the DTU-C of FIG. 8 while possibly reducing memory requirements of the DTU-C.

If it is inconvenient to provide a large FIFO register, the DTU-R structure illustrated in FIG. 9 can be used to reduce the depth of the DTU-C's FIFO register. FIG. 9 is a simplified schematic diagram of a second embodiment of an DTU-R 910 that is capable of transmitting and receiving data in the NS 3 communication system of FIG. 5. The structure of DTU-R 910 of FIG. 9 is similar to the structure of DTU-R 710 of FIG. 7 except that a delay line 907 is interposed between the output of PNS generator 901 and adder 908.

DTU-R 910 of FIG. 9 works with DTU-C of FIG. 8 as follows: The earliest point in time that the DTU-C requires PNS output for descrambling is after the minimum response delay (Dn) after its last poll. Therefore, the DTU-R can use the PNS state that is Dn states after the end of receiving a poll instead of the state immediately after the end of receiving the poll. In this manner, the DTU-C need only wait Dn states after transmitting the end of the poll message before it clears its FIFO register. If an DTU-R responds in the minimum time, the next output from the DTU-C's PNS generator will go directly to the head of the FIFO register 807 and will be used to descramble the first symbol of this response. The DTU-R structure illustrated in FIG. 9 provides a way for the DTU-R to use this delayed PNS state without actually having to wait Dn symbol times (since the DTU-R should always respond with minimal delay.) As shown, the DTU-R 910 has a delay line 907 (i.e., a shift register), which is Dn words deep. When the DTU-R's PNS generator 901 is initialized during training, and after loading the generator with the predetermined initial value, the PNS generator is advanced Dn states and the generated outputs are loaded into the delay line 907. The output of the PNS generator is always Dn states advanced ahead of the output of the delay line that is used to descramble received data. The DTU-R still uses the PNS generator output for the symbol following the last symbol of a poll message to scramble the first symbol of its transmitted response. Since this first symbol is now delayed Dn states from the end of the received message, the DTU-C can wait Dn states before clearing its FIFO register. The required depth of the DTU-C's FIFO is thereby reduced to the difference between the maximum and minimum response delay time (Dx–Dn).

It will be apparent to those skilled in the art that many modifications and variations may be made to the preferred embodiments of the present invention, as set forth above, without departing substantially from the principles of the present invention. For example, although some of the embodiments are illustrated with regard to an DTU system, the same principals apply to any digital communication system in which each of the devices involved in scrambling/descrambling is commonly clocked. All such modifications and variations are intended to be included herein within the scope of the present invention, as defined in the claims that follow.

Therefore, having thus described the invention, at least the following is claimed:

1. A communication device for scrambling a digital data stream for use in a non-self-synchronizing scrambling (NS3) communication system, said system supporting a variable number of bits per symbol less than or equal to a maximum number of bits per symbol, said digital data stream comprising a series of bits and having a bit transmission rate, the communication device comprising:

means for converting each N bits of the digital data stream into a symbol index to produce a stream of symbol indices;

means for generating, at a rate derived from a symbol rate and different than the bit transmission rate, a pseudo-noise sequence (PNS), said PNS comprising M output bits, wherein M is at least as large as said maximum number of bits per symbol and M is independent of N; and means for modifying said stream of symbol indices based on said PNS to produce a symbol-wise scrambled digital data stream, wherein said symbol-wise scrambled digital data stream is capable of being descrambled by a second modifying means that is the inverse of said modifying means.

2. The communication device of claim 1, further comprising:

means for transmitting said scrambled digital data stream.

3. The communication device of claim 1, wherein said generating means is an encryption device.

4. The communication device of claim 1, wherein said modifying means is a modulo-2 adder.

5. The communication device of claim 1, wherein said modifying means is an arithmetic adder.

6. The communication device of claim 1, wherein said rate is a whole or fractional multiple of the time interval between each symbol in said set of symbol indices.

7. A method for scrambling a digital data stream for use in a NS3 communication system, said digital data stream comprising a series of bits and having a bit transmission rate, the method comprising the steps of:

generating a PNS, where said PNS is comprised of M bits, where M is greater than or equal to a maximum possible number of bits per symbol supported by the NS3 communication system;

converting said digital data stream to a stream of symbol indices, said stream of symbol indices having a symbol rate;

combining, at said symbol rate, said symbol indices with said PNS to produce a symbol-wise scrambled digital data stream.

8. The method of claim 7, wherein said generating step further comprises generating said PNS with an encryption algorithm.

9. The method of claim 7, where said combining step further comprises modulo-2 adding of said symbol indices and said PNS.

10. The method of claim 7, wherein said combining step further comprises arithmetic adding of said symbot indices and said PNS.

11. The method of claim 7, where said combining step combines the N least significant bits of said M bits of said PNS.

12. The method of claim 7, wherein each symbol indux is comprised of N bits, and wherein M is independent of N.

13. The method of claim 7, wherein said symbol rate is a whole or fractional multiple of the time interval between each symbol in said set of symbol indices.

14. The method of claim 7, further comprises:
transmitting said scrambled digital data stream.

15. A communication system having a variable data rate and a variable number of bits per symbol, wherein the variable number of bits per symbol is less than or equal to a maximum number of bits per symbol, the system comprising:
   a bit-to-symbol converter configured to operate at a current number of bits-per-symbol N, to produce a stream of symbol indices from a digital bit stream;
   a PNS generator configured to maintain a state and to produce M output bits at a rate derived from a current symbol rate, wherein M is at least as large as the maximum number of bits per symbol;
   means for combining the stream of symbol indices and the N least significant output bits to produce a symbol-wise scrambled digital data stream;
   an encoder configured to encode the symbol-wise scrambled digital data stream; and
   a modulator configured to modulate the encoded symbol-wise scrambled digital data stream.

16. The system of claim 15, wherein M is independent of N.

17. The system of claim 15, wherein the state is independent of the number of bits per symbol.

18. A non-self-synchronizing scrambling (NS3) communications system, comprising:
   a first communications device comprising:
      a bit-to-symbol converter configured to oeprate at a current number of bits-per-symbol N, to produce a stream of symbol indices from a digital bit stream;
      a first PNS generatpr configured to maintain a first state and to produce M first PNS output bits at a rate derived from a current symbol rate, wherein M is at least as large as the maximum number of bits per symbol;
      first means for combining the stream of symbol indices and at least one of the first PNS output bits to produce a first symbol-wise scrambled digital data stream; and
      means for tramsmitting the first symbol-wise scrambled digital data stream; and
   a second means device comprising:
      means for receiving the first symbol-wise scrambled digital data stream;
      a second PNS generator comfigured to maintain a second state and to produce M second PNS output bits at a rate derived from a current symbol rate
      a second means for combining the first symbol-wise scrambled digital data stream and at least one of the second PNS output bits to produce a first symbol-wise descrambled digital data stream; and
      a symbol-to-bit converter configured to operate at a current number of bits-per-symbol N, to produce a bit stream for the first symbol-wise descrambled digital data stream.

19. The system of claim 18, wherein said first communication device is an Digital Subscriber Line Transceiver Unit-Central Office (DTU-C) and said second communication device is an Digital Subscriber Line Transceiver Unit-Remote (DTU-R).

20. The system of claim 18, further comprising a plurality of additional DTU-Rs, said plurality of additional DTU-Rs having the same capabilities as said second communication device.

21. The system of claim 17, wherein said first communication device further comprises a FIFO register to store previous states of said first PNS generator.

22. The system of claim 18, further comprising means for delaying said second PNS output bits, wherein said second combining means combines said delayed second PNS output bits and said symbols to produce the second symbol-wise scrambled digital data stream.

23. The system of claim 18, wherein the first PNS generator is further configured to initialize the first state using a predetermined value, and wherein the second PNS generator is further configured to initialize the second state using the predetermined value.

24. The system of claim 18, wherein the second communications device further comprises means for scrambling and transmitting a second digital data stream and wherein the first communications device further comprises means for receiving and descrambling the second scrambled digital data stream.

25. The system of claim 24, wherein the second communications device further comprises:
   first means for converting said second digital data stream from bits into symbols; and
   third means for combining said symbols and said second output bits to produce a second symbol-wise scrambled digital data stream;
   and wherein the first communications device further comprises:
   fourth means for combining the second symbol-wise scrambled digital data stream to produce a second symbol-wise descrambled digital data stream; and
   second means for converting said second symbol-wise descrambled digital data stream from symbols into bits.

26. The communication system of claim 18, wherein said first communications device is located at an ingress point to a communications medium and said second communications device is located at an egress point to said communications medium.

27. A method for non-self-synchronizing scrambling (NS3) in a system having a symbol rate and a symbol period equal to the inverse of the symbol rate, comprising the steps of:
   in a first communication device:
      initializing a first PNS generator state to a predetermined initial value on receipt of a final first symbol during a training phase;
      generating first PNS output bits each symbol period;
      advancing the first PNS generator state at the end of each interval in a common timing reference, where said common timing reference is a multiple of the symbol rate;
   in a second communication device:
      initializing a second PNS generator state to the predetermined initial value on receipt of a final second symbol during the training phase;
      generating second PNS output bits each symbol period; and
      advancing the second PNS generator state at the end of each interval in the common timing reference.

* * * * *